United States Patent [19]

Price

[11] 4,241,787
[45] Dec. 30, 1980

[54] DOWNHOLE SEPARATOR FOR WELLS

[76] Inventor: Ernest H. Price, 1266 Pepper Dr., El Centro, Calif. 92243

[21] Appl. No.: 55,158

[22] Filed: Jul. 6, 1979

[51] Int. Cl.³ .................... E21B 43/02; E21B 43/38
[52] U.S. Cl. .................... 166/105; 166/106; 166/228; 166/305 D; 210/500.2; 210/497.1; 210/494.2; 166/265
[58] Field of Search ............. 166/265, 305 D, 314, 166/68, 105, 105.1, 105.5, 106, 107, 228; 210/500 M, 497 R, 497.1, 494 M

[56] References Cited

U.S. PATENT DOCUMENTS

| | | |
|---|---|---|
| 2,281,801 | 5/1942 | Reynolds et al. |
| 2,523,091 | 9/1950 | Bruce |
| 2,692,051 | 10/1954 | Webb |
| 2,946,387 | 7/1960 | Hooker, Jr. .................... 166/105 |
| 3,066,732 | 12/1962 | McEver |
| 3,167,125 | 1/1965 | Bryan .................... 166/305 D |
| 3,195,633 | 7/1965 | Jacob .................... 166/305 D |
| 3,375,666 | 4/1968 | Sutton .................... 166/305 D |
| 4,014,387 | 3/1977 | Fink .................... 166/314 |

*Primary Examiner*—Stephen J. Novosad
*Attorney, Agent, or Firm*—Dennis T. Griggs

[57] ABSTRACT

Method and apparatus for producing oil from a subsurface formation containing both oil and water is disclosed. The oil and water are separated downhole within the well with the separated water being conveyed through a well bore and discharged into a disposal formation without raising it to the surface of the well, unless the pressure in the dispersal formation is excessive. The oil is separately conveyed through the well bore to the surface. Separation of the oil and water is carried out by a separator assembly which includes an outer shell having an upper end fitted for connection to a pump intake, a lower end having perforations for admitting formation fluid, a centrally disposed collector tube extending through the shell and dividing the shell into a central flow passage and an annular flow passage, and a laminated filter element disposed in the annular flow passage and convolutely wound around the collector tube. The filter element includes first and second semipermeable membrane sheets which are wettable only to water, a porous substrate sheet interleaved between the first and second semipermeable membrane sheets, and a perforated spacer element interleaved between the adjacent semipermeable layers and wound in convolute relation therewith. Formation fluid is pumped through the space provided by the spacing element with the water phase permeate being collected and conveyed through the collector tube and the remaining crude oil phase fluid being conveyed through the spaces between the semipermeable layers.

7 Claims, 11 Drawing Figures

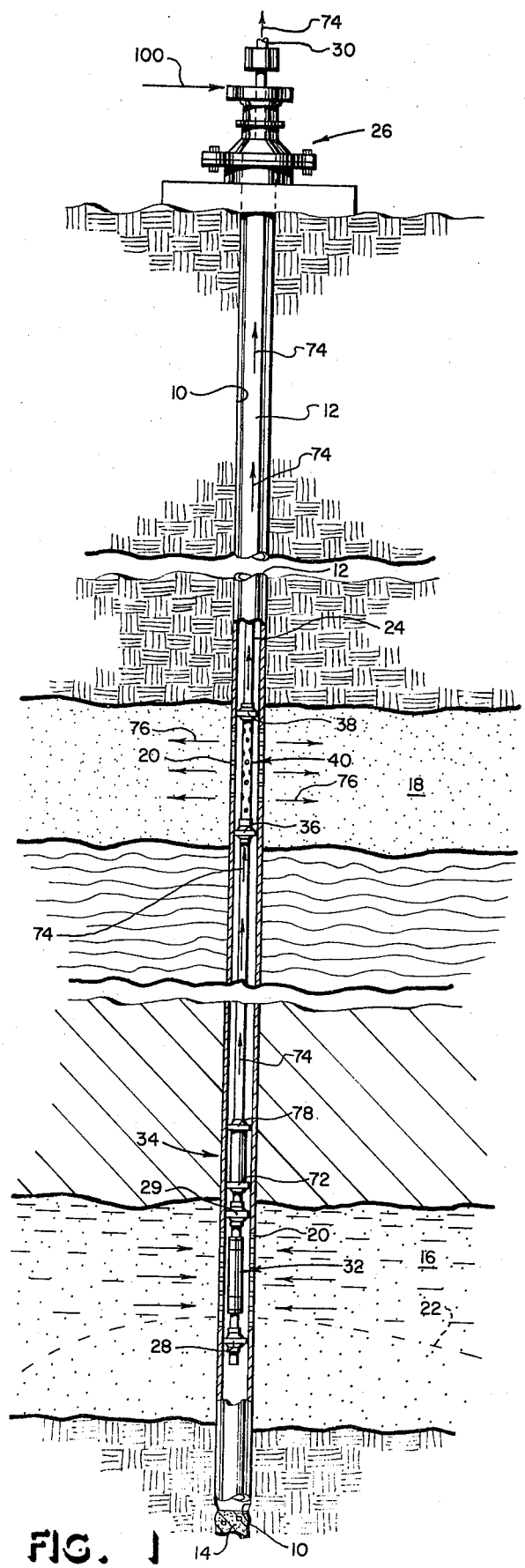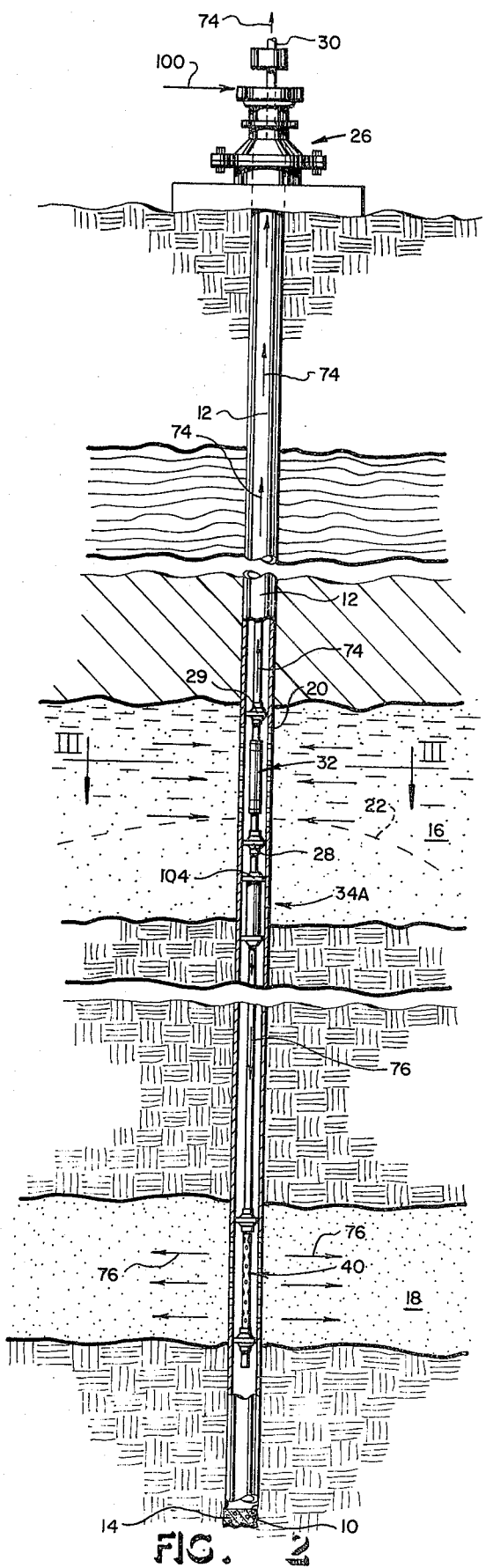

DOWNHOLE SEPARATOR FOR WELLS

BACKGROUND OF THE INVENTION

1. Field of the Invention

This invention relates generally to oil well production, and in particular to a method and apparatus for separating oil and water below the surface of the ground so that only oil is produced at the surface with the water being separately conveyed through the well bore and discharged into a disposal formation without raising it to the surface of the well.

2. Description of the Prior Art

Oil and/or gas wells quite often pass through productive strata whose yield, besides including oil, gas and other valuable products also includes undesirable and unwanted heavy precipitates such as salt water. In oil well production operations, relatively large quantities of water are frequently produced along with the valuable products. This is particularly true during the latter stages of the producing life of a well. Handling this water represents a significant expense in lifting, separation and disposal.

Various methods have been employed for extracting the valuable yield from the heavier and unwanted precipitates such as salt water. Some have involved the pumping of the total yield to the surface of the well and then using various methods for separating the valuable yield from the unwanted portion of the yield. In addition, the unwanted portion of the yield, after having been pumped to the top of the well and separated, has been pumped downwardly again through a remote well bore into a disposal stratum.

In some oil wells the unwanted heavier precipitate can amount to as much as 80% to 90% of the total yield and accordingly, in order to obtain a given volume of valuable yield from the well eight or nine times the volume of the valuable yield must first be pumped to the surface of the well and then the valuable yield must be separated from the unwanted portion of the yield. As previously set forth this process can be very slow and expensive. Although the problem of producing waterfree oil from a reservoir may occur at any stage in the life of an oil well, the proportion of water to valuable yield generally increases with time as the oil reserves decline. Ultimately, when the lifting costs of the combined oil and water exceed the value of the recovered oil, abandonment becomes the only reasonable alternative. As production nears this stage, the local area of the oil field is considered as being exhausted and the well is referred to as being a "stripper".

Many procedures have been tried for producing waterfree oil from a formation which includes a large quantity of water. For example, the oil and water produced are pumped or otherwise flowed together to the surface where they are treated to separate the oil from the water. Since the volume of the water is usually much greater than that of the oil, the separator must handle large volumes of water and therefore must be large and accordingly relatively expensive. Moreover, the water produced contains mineral salts which are extremely corrosive, particularly in the presence of air. Also, flowing of the oil and water together upwardly through the well sometimes results in emulsions forming which are difficult to break. Such emulsions frequently must be heated in order to separate them even in the presence of emulsion treating chemicals. The heating of the large amount of water, as well as the small amount of oil, requires an expenditure of large amounts of energy to reduce the net equivalent BTU production from the well.

Water produced from deep formations within the earth frequently contains large amounts of natural salts. For this reason, the produced salt water cannot be disposed of by allowing it to flow into surface drains or waterways. Relatively small volumes of salt water can sometimes be disposed of by drainage into a slush pit or evaporation tank. However, the required disposal method for large volumes of salt water is to introduce the water into a subsurface formation where no damage can result. This requires that a disposal well be provided for receiving the produced salt water. By returning the water to the same formation in this manner, the water is disposed of and also acts more or less as a repressurizing medium to aid in maintaining the bottom hole pressure and in driving the well fluids toward the producing well. In those areas where producing wells are widely separated, the cost of drilling disposal wells for each producing well is prohibitive. In such instances, it is necessary to lay a costly pipeline gathering network to bring all of the produced water to a central location, or alternatively, to transport the produced water by trucks or similar vehicles. Regardless of the method for transporting the waste salt water from the producing well to the disposal well, the cost of the disposal can be, and usually is, prohibitive.

OBJECTS OF THE INVENTION

The principal object of the present invention is the provision of method and apparatus for separating oil and water within a well bore for producing waterfree oil at the surface while injecting the water into a disposal stratum thus eliminating lifting and surface handling of the water.

Another object of the invention is to provide a well pumping system in which the pressure in the producing formation or formations is maintained by the downhole separation of the water and oil with return of the separated water into the producing formation through the same well bore at a lower elevation.

Yet another object of the present invention is to provide a method of returning water to a well formation simultaneously with the removal of the well fluids from the formation, whereby an offset well is not necessary to conduct the water to the formation and also whereby the production of the well fluids may continue without interruption during the return of such water.

A particular object of the invention is to provide an improved method wherein water and oil are separated in a well bore, after which the oil is lifted to the surface while the water is returned to the same reservoir or to a disposal reservoir, through the same well bore, whereby production of the oil may continue during the return or disposal of the water.

Still another object of the invention is to provide an improved separator which will effectively separate water from oil in a well bore, whereby the water need not be lifted to the surface to be separated.

Yet another object of the invention is to provide an improved method for simultaneously lifting oil to the surface and returning water to a producing reservoir or to a disposal reservoir through the same well bore which includes packing off the bore below the producing strata and conducting the water to the reservoir or to the disposal reservoir below the packing, whereby the returned water does not interfere with normal production of well fluids from the producing zone.

A further object of the invention is to provide an improved method for simultaneously lifting oil from a producing reservoir to the surface and returning water to a disposal zone above the reservoir through the same well bore which includes packing off the bore above the producing strata and conducting water to the disposal zone above the packing whereby the return water does not interfere with normal production of well fluids from the producing reservoir.

A further object of the invention is to carry out the disposal of waste salt water produced in a well bore with a minimum of expenditure of power and without returning the waste salt water to the surface.

Still another object of the invention is to provide an improved downhole filtration system wherein two pumps are coupled in parallel fluid relation with a single separator for conducting well fluids from a producing strata to the separator assembly to separate oil from water, after which the oil is lifted to the surface by one pump while the water is discharged into a disposal formation by the other pump.

Finally, it is an important object of the present invention to provide an improved well pumping assembly and oil/water separator which may be run into and anchored in a well casing and which may be readily removed at any desired time.

SUMMARY OF THE INVENTION

According to novel features of the present invention, the foregoing objects are achieved by a separator for separating oil and water downhole within the well in combination with first and second pumps for discharging the separated water into a disposal formation without raising it to the surface of the well, while pumping the oil separately through the well bore to the surface. Separation of the oil and water is carried out by a separator assembly which includes an outer shell having an upper end fitted for connection to a pump intake, a lower end having perforations for admitting formation fluid, a centrally disposed collector tube extending through the shell and dividing the shell into a central flow passage and an annular flow passage, and a laminated filter element disposed in the annular flow passage and convolutely wound around the collector tube. The filter element includes first and second semipermeable membrane sheets which are wettable only to water, a porous substrate sheet interleaved between the first and second semipermeable membrane sheets, and a perforated spacer element interleaved between the adjacent semipermeable layers and wound in convolute relation therewith. Formation fluid is pumped axially through the space provided by the spacing element with the salt water permeate being collected and conveyed through the collector tube and the remaining crude oil being conveyed to the surface through the spaces intermediate the semipermeable layers.

The foregoing and other related objects and advantages of the present invention will become more apparent from the following specification, claims and appended drawings wherein:

DESCRIPTION OF THE DRAWINGS

FIG. 1 is a vertical, sectional view of a well bore extending through a production zone and a disposal zone located above the production zone with the separator and pump assembly of the invention arranged for lifting separated oil to the surface and discharging the separated water into the disposal zone.

FIG. 2 is a view similar to FIG. 1 in which the relative positions of the disposal zone and production zone are reversed, with separated oil being lifted to the surface and separated water being discharged to the disposal zone below.

DESCRIPTION OF THE PREFERRED EMBODIMENT

Figure 3:
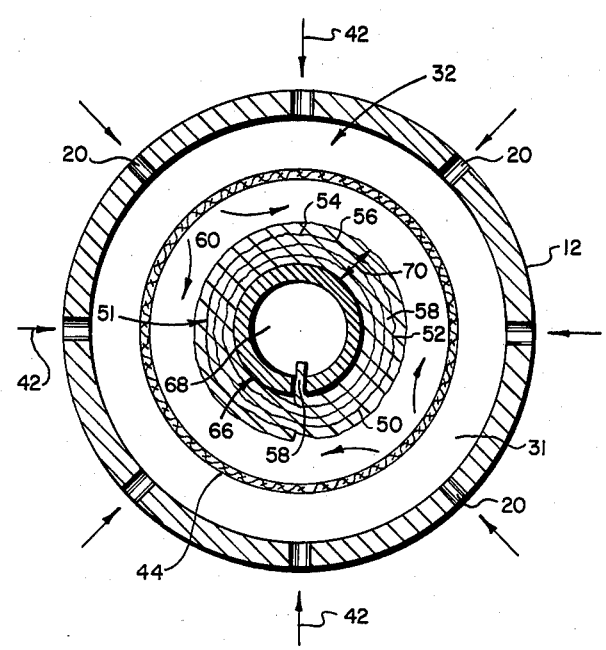
FIG. 3 is a sectional view of the separator taken along the line III—III of FIG. 2.
Figure 4:
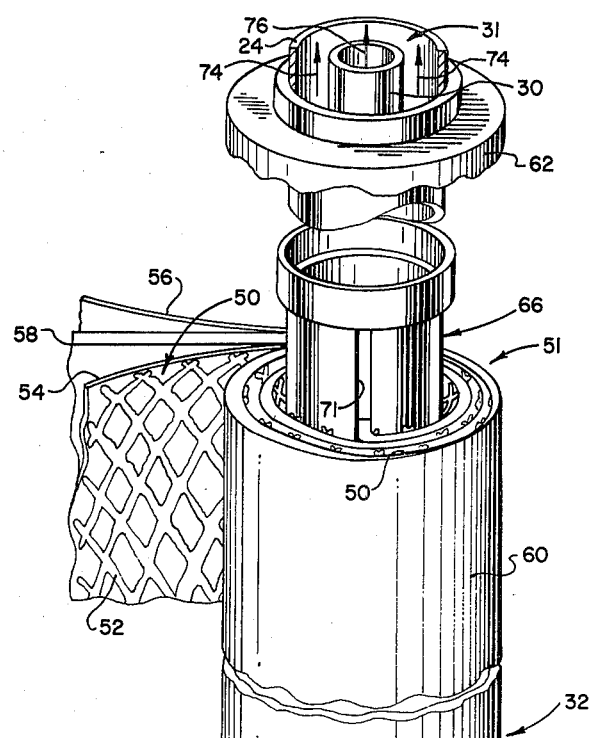
FIG. 4 is a perspective view, partly broken away, of a separator constructed according to the teachings of the present invention.
Figure 6:
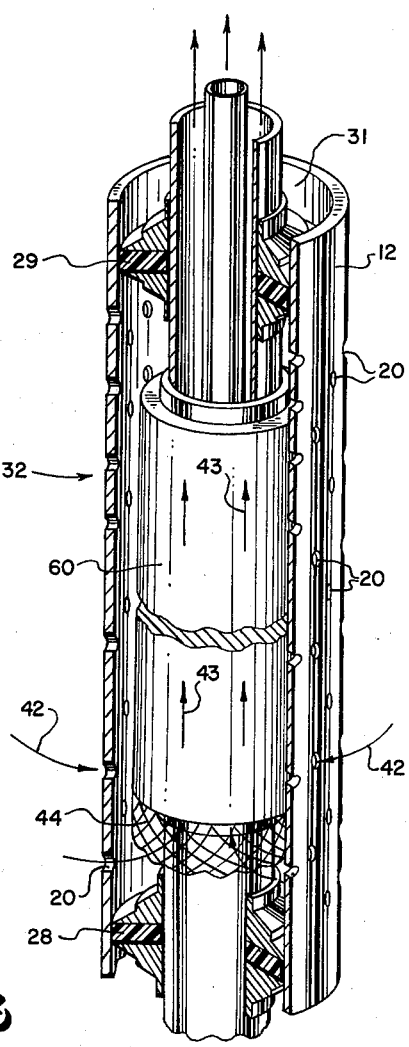
FIG. 6 is a perspective view of the separator assembly of the invention enclosed within a perforated section of well bore casing.
Figure 5:
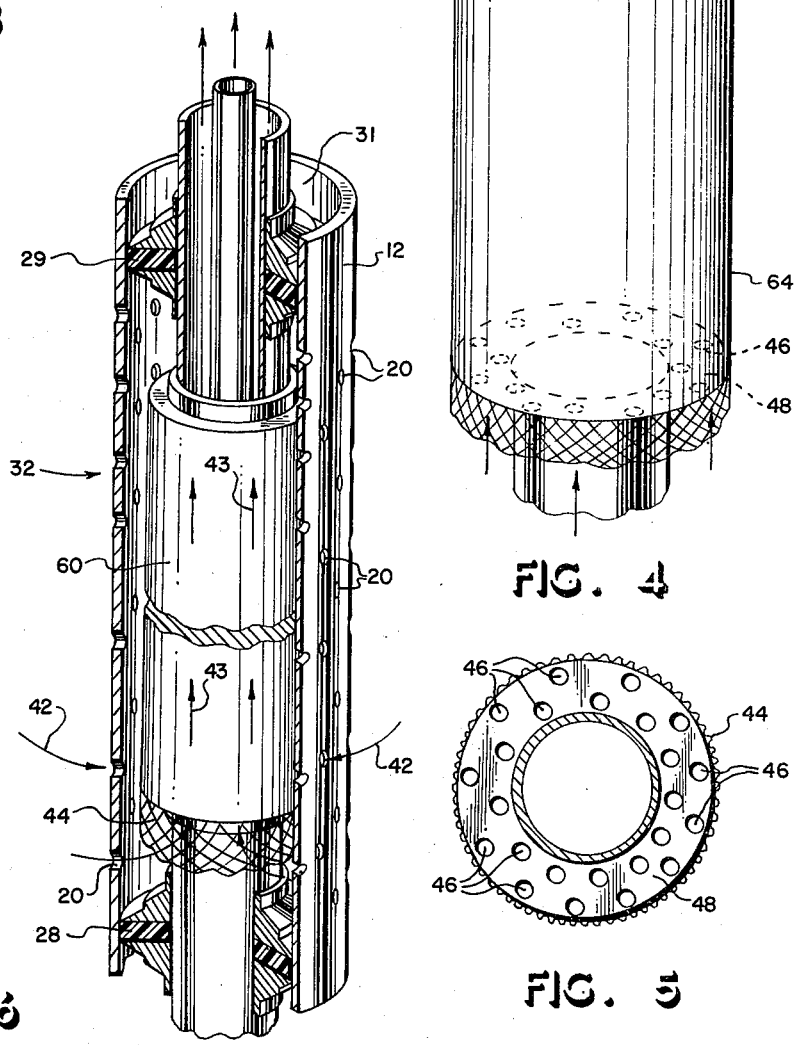
FIG. 5 is a bottom view of the separator shown in FIG. 4.

In the description which follows, like parts are marked throughout the specification and drawings with the same reference numerals, respectively. The figures are not necessarily drawn to scale and in some instances portions have been exaggerated in order to more clearly depict certain features of the invention.

Referring now to FIG. 1 of the drawings, a plurality of earth formations are traversed by a well bore 10 which is drilled by conventional techniques. The well bore is fitted with a production casing 12 which is cemented in place at the bottom of the bore by a cement plug 14. After the casing 12 has been cemented in place, it is perforated at two levels, one level of perforations being in a known production zone 16 and the other layer of perforations being in a known disposal zone 18. The location of the disposal zone 18 and production zone 16 is determined by any of the known methods of well logging. Perforations 20 are formed in the casing by conventional perforation techniques. The perforations 20 in the production zone permit production fluids to enter the interior of the casing 12, and the perforations 20 in the disposal zone permit water separated from the production fluid according to the teachings of the present invention to be discharged laterally into the disposal zone 18.

Prior to the drilling of the bore hole 10 into the production zone 16, there is a more or less well defined normal static interface 22 between the oil and salt water in the porous reservoir formation 16, since these liquids have been segregated by gravity into their respective zones due to their different specific gravities. The perforations 20 are preferably made in the casing slightly above the actual oil/water interface. During the initial production stage, the depth of the production zone 16 may range from as little as one foot to over a thousand feet or more. This layer could lie from a hundred feet to ten thousand feet or more below the earth's surface.

Continued production of oil from this well gradually reduces the thickness of the oil layer and permits the oil/water interface 18 to gradually rise. It can rise to its maximum level known as its "potential free water level" (PFWL). The position of the PFWL relative to the oil/water interface 22 can be determined by conventional techniques, such as by measuring the thickness of the producing formation 16 and multiplying it by the specific gravity of the oil. The perforations 20 are preferably formed in the casing 10 at an elevation equal to or slightly above the elevation of the PFWL.

In completing the well according to the present invention, a production string 24 extends from a surface well head 26 to a conventional production packer 28 which closes off the annulus between the production casing and the production string 24. A production packer 29 also anchors the production tubing in the well. Concentrically received within the production string 24 is a tubing string 30 which defines a production channel through which separated crude oil is lifted to the well head 26, with the annulus between the central tubing string 30 and production string 24 defining a separate channel 31 through which salt water is conveyed to the disposal zone 18.

Figure 7:
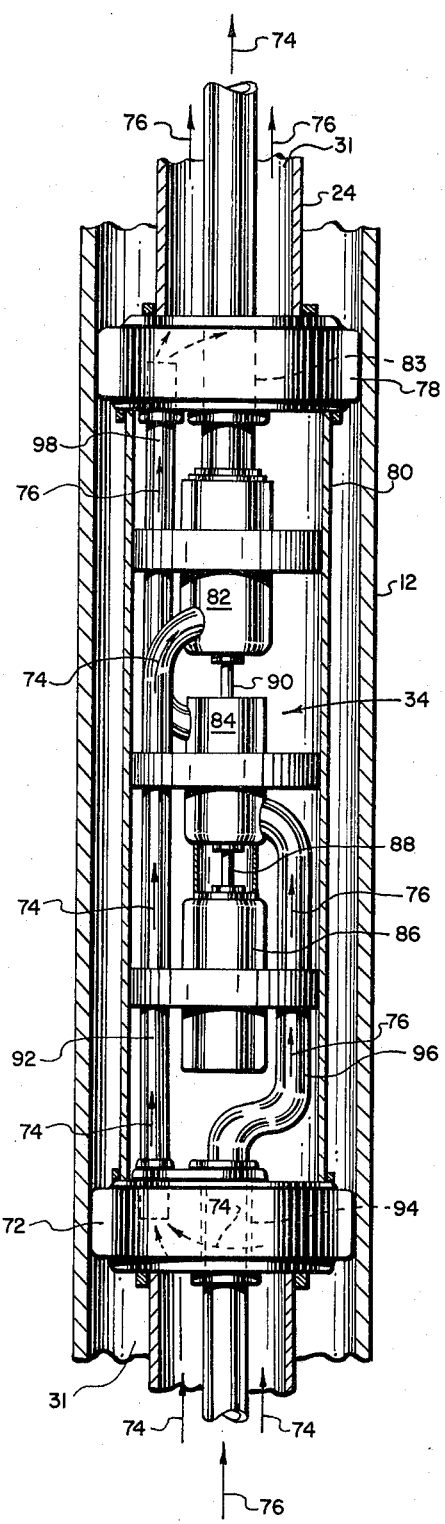
FIG. 7 is an elevation view, partly in section, of the pump assembly shown in FIG. 1.

According to the invention in its broadest aspects, formation fluid from the production zone 16, including both oil and water, enters the production casing 12 through the perforations 20 and is conveyed under pressure through a filter or separator assembly 32 where the oil and water are separated and fed into separate pumps of a pump assembly 34 as can best be seen in FIG. 7 of the drawing. After the production fluid is separated into its oil phase and water phase by the separator assembly 32, the oil phase of the formation fluid is lifted through the central tubing string 30 to the well head 26 where it is stored in a holding tank (not shown) for trans-shipment to a refinery. The separated water, on the other hand, is discharged through the annulus 31 intermediate the production tubing string and the central tubing string and is lifted upwardly for discharge into the disposal zone 18. The annulus 31 between the production casing 12 and the production tubing string 24 is sealed off by packers 36, 38 near the lower and upper boundaries of the disposal zone 18, and the production tubing string 24 is provided with a perforated section 40 through which the salt water flows as it is pumped into the disposal zone 18. According to this arrangement, crude oil is produced and delivered at the well head 26 simultaneously with the separation and discharge of salt water into the disposal zone 18. The salt water may be delivered to the surface for disposal if the pressure of the subsurface disposal formation is too high.

Referring now to FIGS. 3-6, the separator assembly 32 is supported in concentric relation within the perforated section of the production casing 12 by means of the packers 28, 29. Production fluid including both oil and water enters the perforations 20 as indicated by the arrows 42 and is drawn upwardly through the separator assembly 32 as indicated by the arrows 43 in response to the downhole pressure associated with the production zone 16 and in response to the suction developed by the pump assembly 34.

Referring now to FIG. 3, formation fluid 42 entering the annulus 31 is pre-filtered by a wire screen 44, for example 100 mesh, which serves as a coarse filter for preventing the entry of sand and small bits of rock which are usually found in such formation fluid. After negotiating the screen 44, the production fluid enters perforations 46 formed in a bottom plate 48 of the filter assembly. In response to the suction and pressure, the formation fluid is directed axially through the spiral space 50 in a laminated filter element 51 formed by a perforated spacer element 52 which is wound in convolute relation along with dual semipermeable membranes 54, 56 which are disposed in interleaved relation with a porous substrate 58.

The separator assembly 32 includes an outer shell 60 having an upper end 62 fitted for connection to a pump intake, a lower end 64 supporting the perforated bottom plate 48 admitting formation fluid, and a centrally disposed collector tube 66 extending through the shell 60 and dividing the shell into a central flow passage 68 and an annular flow passage 70. The laminated filter element 51 is convolutely wound around the collector tube 66 and is disposed within the annular flow passage 70. After entering the perforations 46 of the bottom plate 48, the formation fluid is pumped axially into the spiral space 50 provided by the spacing element 52 with the salt water permeate flowing radially through the interleaved semipermeable membranes 54, 56 and also spiralling through the porous substrate 58 through the slot 71 in the collector tube 66 at the center.

The semipermeable membranes 54, 56 preferably comprise a membrane material that is extremely hydrophilic, that is one that has a very strong affinity for water. Such materials remain wetted even in the presence of hydrophobic particles, so that the particles cannot adhere to the surface by excluding water. A preferred hydrophilic polymer is a sulfonate polymer, that is, a polymer bearing on its surface the sulfonate group, $SO_3^-$. This membrane is preferably formed by casting a membrane of styrene based polymer with sulfonate groups exposed at the membrane surface and within the pores of the membrane to form a thin film of the sulfonate polymer on its surface, then adding a chemical agent that creates cross links among the resulting long chain molecules.

For production fluid comprising an oil and water emulsion (water is the continuous phase), assuming a 100 psi driving pressure at 100° F., it has been determined that from 50 to 100 gallons of water per square foot of separator assembly can be removed in each 24 hour operating period. The spiral module configuration 51 described above having a 2 inch diameter and 12 inches long has an effective filter area of 5 square feet. Assuming a ratio of water to oil of approximately 10 to 1, the corresponding crude oil separation would be 5 to 10 gallons of crude per square foot per day, or 25 to 50 gallons of crude per day for each foot in length of a 2 inch diameter filter element 51.

As the differential pressure across the filter element 51 increases, the flux, that is the amount of salt water permeate increases, but the concentration polarization effect also increases, that is the collection of droplets at the membrane interface would increase. This can be alleviated by stirring the formation fluids as they enter on the high pressure side of the filter assembly.

As the production fluid traverses the filter element 51, salt water permeate is rapidly conveyed radially toward the collector tube 66 as the formation fluid advances along the length of the assembly. Because the semipermeable membranes are wettable only by water, the crude oil remains trapped in the spiral space intermediate the semipermeable membranes 54, 56 and is thereby prevented from entering the collector tube 66.

Referring now to FIG. 7, the crude oil is conveyed through the annulus 31 of the production tubing string 24 into a suction header and connector assembly 72 which forms the lower end of the pump assembly 34. The flow of crude is represented by the arrow 74, and the flow of salt water is indicated by the arrow 76. The pump assembly 34 comprises an upper suction header 78 and a cylindrical housing 80 mounted between the upper and lower suction headers. Enclosed within the pump assembly housing 80 are a crude oil pump 82, a brine pump 84 and an electric drive motor 86. The crude oil pump 82 and brine pump 84 are mounted in tandem for receiving a common rotory driving force from the electric motor 86. The electric motor 86 is mechanically coupled to the brine pump 84 by means of a shaft 88 and the crude oil pump 82 is coupled to the brine pump 84 by means of a shaft 90. It should be understood that the arrangement shown in FIG. 7 is a more or less idealized representation of commercially available electrical submersible pumps. After flowing through the annulus 31, the crude is evacuated from the lower suction header 72 and is conveyed through pump inlet tubing 92 to the crude oil pump 82. It is discharged from the pump 82 through a feed-through tube 83 which forms a separate path for the crude through the suction header 78. The salt water 76, on the other hand, is separately conveyed through the suction header and connector 72 by means of a feed-through tube assembly 94 and is connected to a pump inlet tube 96 which forms the inlet of the brine pump 84. The output of the brine pump 84 is conveyed through a discharge tube 98 which forms an input to the upper suction header 78. In response to pressure developed by the brine pump 84, the salt water flow 76 is directed through the annulus 31 of the production tubing string 24 and is lifted upwardly for discharge into the disposal zone 18 through the perforated section 40 of the production tubing string 24.

A common power channel (not shown) is brought down from an electrical power connection 100 at the well head 26 to the electric drive motor 86 in the usual manner. Although an electrical submersible pump arrangement is preferred, any of various suitable types of pumps may be used to good advantage. For example, the pumps 82, 84 may be reciprocating plunger pumps, in which case the common power channel and power input means would be suitably connected reciprocating pump rods. Additionally, the pumps may be hydraulic pumps, in which case the common power channel and power input means would be suitably connected hydraulic power tubing. The pumps may also be turbine pumps with the power input means being an elongated shaft rotated by an external prime mover, in which case the common power channel would be a rotatable shaft connecting the two turbine pumps. As illustrated, however, the pumps 82, 84 are turbine pumps driven by an adjoining submersible electrical motor 86, in which case the common power channel and power input is an electrical power cable (not shown).

It should be evident that the invention may be carried out by using two different types of pumps, with different appropriate power channels for each of them. Or, the pumps 82, 84 may be of like kind, but which are powered through separate power channels. However, it is usually preferable to select the pumps according to their expected fluid flow output relative to each other so they can share a common power channel and power input means.

Figure 8:
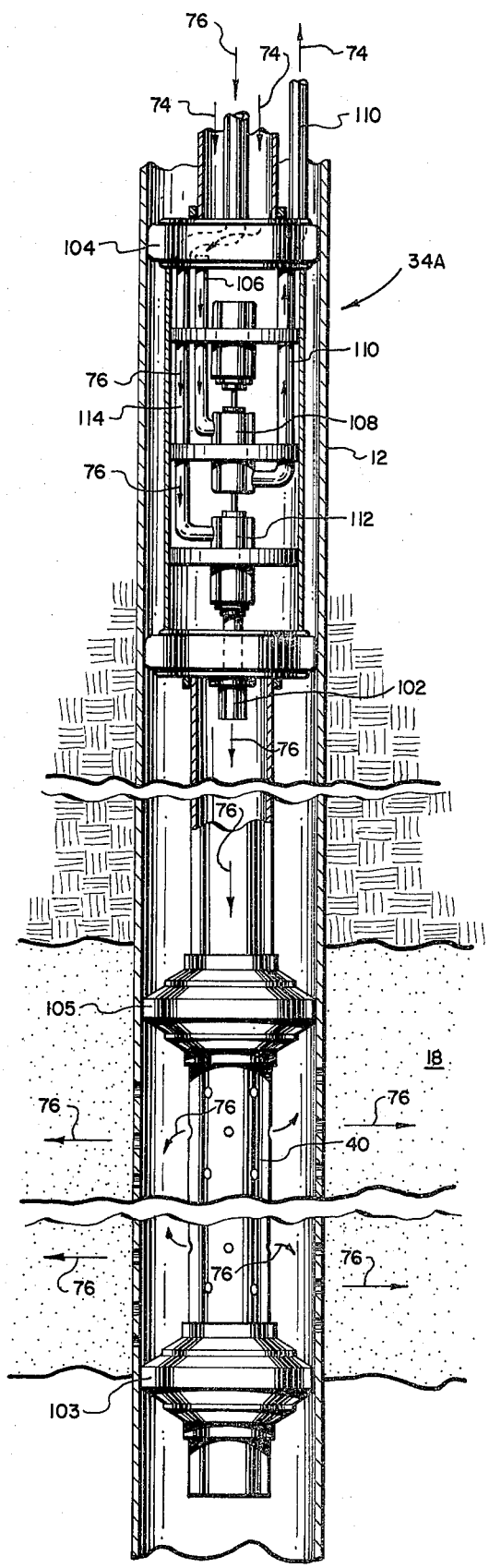
FIG. 8 is an elevation view, partly in section, of the pump assembly shown in FIG. 2.

Referring now to FIGS. 2 and 8, a separator assembly 32 and pump assembly 34A for separately conveying oil to the surface and salt water to a lower disposal zone are illustrated. In this arrangement, the filter assembly 32 is packed off by the packing elements 28, 29 in a perforated section of the well casing for receiving formation fluids from the production zone 16. After being separated in the filter assembly 32 as previously discussed, salt water 76 is pumped through a discharge tube 102 and is discharged under pressure through a perforated section 40 into the disposal zone 18 which lies at a relatively lower elevation with respect to the production zone 16. The perforated section is isolated by the packing elements 103, 105. In this arrangement, crude oil 74 is accumulated in an upper suction header 104 and is conveyed through a pump inlet tube 106 to a crude pump 108. The crude oil is discharged from the pump under pressure through a crude return line 110 to a point above the filter assembly where it is manifolded in communication with the central tubing string 30 for delivery of the crude to the well head 26. With this exception, operation of the assembly in FIG. 8 is essentially the same as that in FIG. 7. That is, a brine pump 112 coupled to the salt water discharge line 114 from the filter assembly is driven in common by means of an electrical drive motor 116. The pump assembly 34A is similarly housed with the motor and pumps suitably supported between the suction headers and cylindrical housing.

Figure 9:
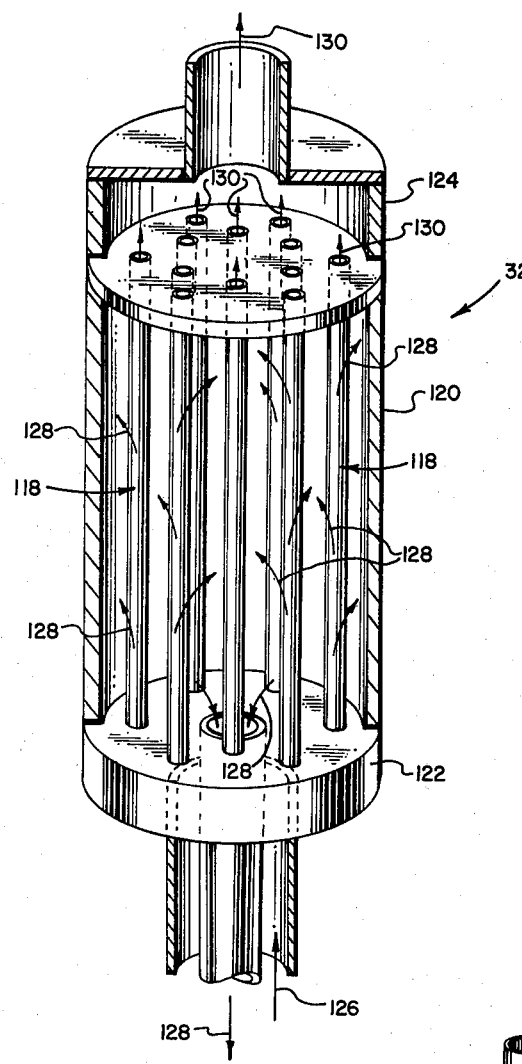
FIG. 9 is a perspective view of an alternate embodiment of the separator assembly of the invention.
Figure 10:
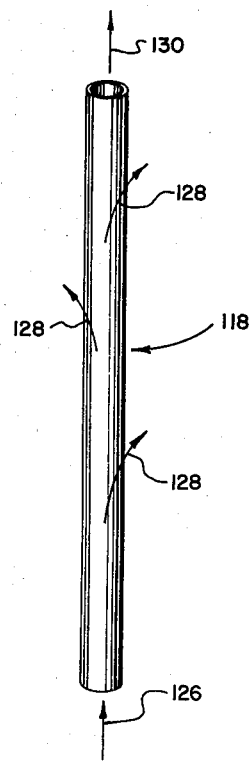
FIG. 10 is a perspective view of a separator element for the separator assembly shown in FIG. 9.

An alternate embodiment for the separator assembly 32 is illustrated in FIGS. 9 and 10. According to this arrangement, the separator comprises an array of elongated separator elements 118 which are elongated tubes having a sidewall formed of semipermeable membrane material that is permeable only to water. The separator elements 118 are preferably constructed of a hydrophilic polymer such as sulfonate polymer. The tubes are preferably formed by extruding a styrene based polymer with sulfonate groups exposed at the membrane surface and within the pores of the membrane to form a tube having a thin film of the sulfonate polymer on its outer surfaces, and then adding a chemical agent that creates cross-lengths among the resulting long chain molecules.

The separator assembly 32 shown in FIG. 9 comprises a cylinder 120 which encloses an array of the elongated separator tubes 118 which are extended through the cylinder from a lower header chamber 122 to an upper discharge chamber 124. Formation fluid comprising a water and oil mixture enters the lower chamber 122 as indicated by the arrow 126 from which it is withdrawn and forced through the tubular separator elements 118. As the water and oil mixture 126 flows through the separator elements, the water permeate flows radially through the side wall of the separator elements as indicated by the arrows 128. Because the walls of the separator elements are permeable only to water, the oil phase continues through the separator tubes as indicated by the arrows 130 and are discharged into the upper header chamber 124. Because the efficiency of this arrangement is proportional to the pressure differential across the separator elements, the water and oil mixture 126 is preferably pumped under pressure into the lower header chamber, and the oil phase permeate 130 is preferably withdrawn from the upper header chamber 124 by means of a separate pump assembly.

Figure 11:
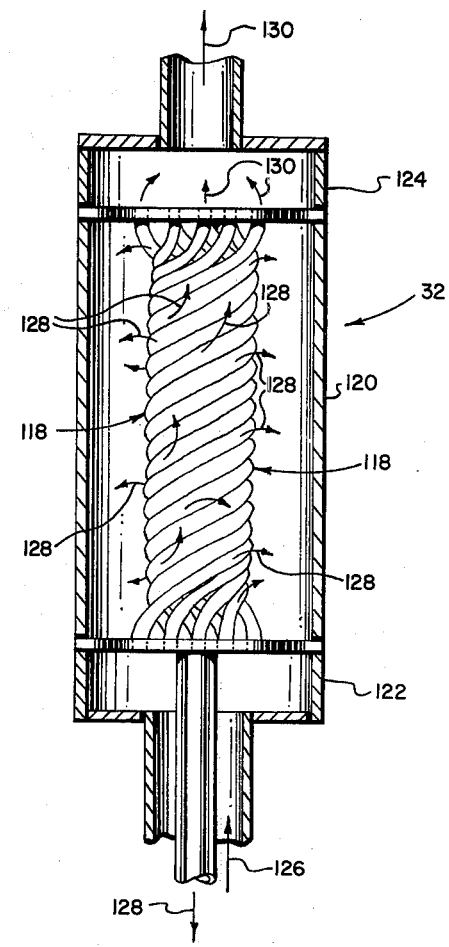
FIG. 11 is an elevation view, partly in section, of a preferred spiral configuration for the separator assembly of FIG. 9.

Although the tubular separator elements 118 are shown in a vertical, parallel array, the separation efficiency can be increased by arranging the tubes to follow a spiral path from the lower header chamber to the upper header chamber, which allows a longer separator length relative to a given cylinder length. Furthermore, since the water phase of the mixture has a higher specific gravity, it is forced radially outwardly in response to the centrifugal forces developed as the water and oil mixture 126 traverses the spiral path through each tube as shown in FIG. 11.

It will be apparent that the invention may be embodied in other specific forms without departing from the spirit or essential characteristics thereof. Thus the present embodiment should therefore be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by U.S. Letters Patent is:

1. A separator assembly for extracting oil from formation fluid containing both oil and water in a downhole formation comprising an outer shell having an upper end fitted for connection to a pump intake, a lower end having an opening for admitting formation fluid, a centrally disposed collector tube extending through the shell and dividing the shell into a central flow passage and an annular flow passage, said collector tube having an opening admitting fluid flow from the annular passage to the central passage, and a laminated filter element disposed in the annular flow passage and convolutely wound around the collector tube, the filter element including first and second semipermeable membrane sheets, a porous substrate sheet interleaved between the first and second semipermeable membrane sheets and communicating with said collector tube opening, and a perforated spacer element interleaved between adjacent semipermeable layers and extending in convolute relation therewith.

2. The separator assembly as defined in claim 1, said semipermeable membrane sheets comprising a sulfonate polymer.

3. Apparatus for producing oil and water separately from production fluid containing both oil and water in a well comprising a casing in the well, production tubing arranged in the casing and extending to the surface for conducting one of the fluids from the well to the surface, a packer between the tubing and the casing above the level of production of the fluids, conducting means for conveying fluid from the well below the packer into the casing above the packer, the conducting means including a separator assembly for selectively passing one of the fluids and first and second pumps connected for receiving the separated fluids and for pumping one of the separated fluids into the production tubing, and the other pump connected for receiving the second separated fluid and conveying it through a separate flow path for discharge into a disposal zone.

4. Apparatus for producing oil and water separately from a well communicating with a subterranean formation in which formation fluid containing both oil and water is produced, comprising a casing in the well between the surface and the producing formation, a production tubing supported in the casing from the surface to a point adjacent the formation, a packer between the tubing and the casing above the formation, a separator assembly defining separate flow paths for separately conveying oil and water, respectively, the separator assembly including a filter element which is selectively permeable only to water, a pump connected intermediate the oil discharge path and the production tubing for lifting the oil phase of the production fluid to the surface, and a second pump connected intermediate the water discharge path of the separator and the annulus of the casing for discharging its affluent into the casing above the packer and outside of the casing for discharge into a disposal zone.

5. A separator assembly for extracting oil from formation fluid containing both oil and water in a downhole formation comprising a tubular separator housing, an input header chamber terminating one end of the housing and fitted for receiving formation fluid, a discharge header chamber terminating the opposite end of the housing and fitted for conducting the oil phase of the formation fluid out of the chamber, a plurality of separator tubes extending through the separator housing and connecting the inlet header chamber in fluid communication with the discharge header chamber, each separator tube having a semipermeable side wall which is permeable to the water phase of the formation fluid and relatively impermeable to the oil phase of the formation fluid.

6. The separator assembly as defined in claim 5, said semipermeable separator tubes comprising a sulfonate polymer.

7. The separator assembly as defined in claim 5, said semipermeable separator tubes being extended through a spiral path from the lower header chamber to the upper header chamber.

* * * * *